United States Patent [19]

Chapman et al.

[11] Patent Number: 5,165,374
[45] Date of Patent: Nov. 24, 1992

[54] INLET ARRANGEMENT FOR AN INTERNAL COMBUSTION ENGINE

[75] Inventors: John Chapman, Dunchurch; Mark W. Garrett, Milverton; Peter H. Parker, Redditch; Robert A. Head, Birmingham, all of England

[73] Assignee: Rover Group Limited, England

[21] Appl. No.: 671,954

[22] Filed: Mar. 19, 1991

[30] Foreign Application Priority Data

Mar. 24, 1990 [GB] United Kingdom ............... 9006639

[51] Int. Cl.⁵ ............................................ F02B 31/00
[52] U.S. Cl. .................................................. 123/308
[58] Field of Search .............................. 123/306, 308

[56] References Cited

U.S. PATENT DOCUMENTS

| | | |
|---|---|---|
| 1,727,265 | 9/1929 | Aseltine . |
| 3,318,292 | 5/1967 | Hideg . |
| 3,408,992 | 11/1968 | von Seggern et al. . |
| 4,105,577 | 4/1977 | Elsbett et al. . |
| 4,174,686 | 11/1979 | Shimizu et al. . |
| 4,228,772 | 10/1980 | Bakonyi . |
| 4,240,387 | 12/1980 | Motosugi et al. . |
| 4,256,062 | 3/1981 | Schafer . |
| 4,269,153 | 5/1981 | Konii et al. ................... 123/308 |
| 4,286,561 | 9/1981 | Tsutsumi ........................ 123/308 |
| 4,308,830 | 1/1982 | Yamada et al. . |
| 4,413,598 | 11/1983 | Tsutsumi . |
| 4,452,218 | 6/1984 | Yokoyama et al. .......... 123/308 |
| 4,543,931 | 10/1985 | Hitomi et al. . |
| 4,700,669 | 10/1987 | Sakurai et al. . |
| 4,779,594 | 10/1988 | Oda et al. . |
| 4,995,359 | 2/1991 | Yokoyama et al. .......... 123/308 |

FOREIGN PATENT DOCUMENTS

| | | |
|---|---|---|
| 0021706 | 6/1980 | European Pat. Off. . |
| 0076632 | 9/1982 | European Pat. Off. . |
| 0074202 | 3/1983 | European Pat. Off. . |
| 0235288 | 8/1985 | European Pat. Off. . |
| 221312 | 5/1987 | European Pat. Off. . |
| 2709519 | 3/1977 | Fed. Rep. of Germany . |
| 2027125 | 7/1979 | Fed. Rep. of Germany . |
| 2569227 | 2/1983 | France . |
| 59-120718 | 7/1984 | Japan . |
| 61-28715 | 6/1986 | Japan . |
| 60523 | 3/1948 | Netherlands . |
| 652671 | 8/1946 | United Kingdom . |
| 1135482 | 3/1966 | United Kingdom . |
| 1293772 | 12/1969 | United Kingdom . |
| 1457152 | 6/1974 | United Kingdom . |
| 2016081 | 5/1978 | United Kingdom . |
| 2027796 | 5/1979 | United Kingdom . |
| 2079763 | 6/1980 | United Kingdom . |
| 2064646 | 12/1980 | United Kingdom . |
| 2087480 | 5/1982 | United Kingdom . |
| 2107780 | 9/1982 | United Kingdom . |
| 2196386 | 4/1988 | United Kingdom . |
| 2196388 | 4/1988 | United Kingdom . |
| 79/00501 | 12/1978 | World Int. Prop. O. . |

*Primary Examiner*—Noah P. Kamen
*Attorney, Agent, or Firm*—Davis, Bujold & Streck

[57] ABSTRACT

The inlet arrangement comprises two inlet ports for a fuel and air mixture each of which terminates at an orifice openable and closeable by a respective valve. Each inlet port is of a high flow/low swirl type and a mixture of fuel and air which flows through the orifice can be deflected to enable the inlet port to perform as a low flow/high swirl at smaller throttle openings. In one embodiment, flow of mixture through the inlet port can be deflected at low throttle openings by a transverse flow of gas from inlet ducts. In other embodiments, the direction of mixture flow can be varied by members movable into and out of the mixture flow.

15 Claims, 13 Drawing Sheets

INLET ARRANGEMENT FOR AN INTERNAL COMBUSTION ENGINE

BACKGROUND OF THE INVENTION

The invention relates to an inlet arrangement for an internal combustion engine.

It is known that combustion in an internal combustion engine can be improved by controlling turbulence within the combustion chamber of the fuel and air mixture immediately prior to combustion. A certain amount of turbulence can be created by causing the mixture to swirl around the axis of the combustion chamber (generally known as axial swirl). However such swirl does not lead to significant turbulence immediately prior to combustion.

Better turbulence characteristics can be obtained by inducing what is known as barrel swirl as illustrated in FIGS. 1, 2 and 3 of the accompanying drawings which are diagrammatic cross sections through a cylinder. In FIG. 1, a mixture of fuel and air has been induced into a cylinder 1 by a descending piston 2 and the incoming mixture follows a generally cylindrical path indicated by arrow A transverse the axis X of the combustion chamber. As the piston 2 ascends, compression of the mixture causes the cylindrical motion of the mixture to increase in speed as in FIG. 2 until eventually, as shown in FIG. 3, the swirling mixture breaks down into a large number of small eddies E immediately prior to combustion. Such barrel swirl provides a greatly improved turbulence of the air and fuel mixture immediately prior to combustion and is highly desirable. Such small eddies are known in the art as "micro turbulence". It has been found that an inlet port giving high barrel swirl provides good part throttle stability, fuel economy, lean burn limit and good idle stability. Such inlet ports are conveniently referred to as low flow/high swirl ports. It has also been found that where the inlet port is designed to enable a high rate of mixture to flow directly into the cylinder with zero or low induced barrel swirl, high specific power outputs can be achieved giving higher Kw/litre of engine capacity. Such inlet ports are conveniently referred to as high flow/low swirl ports.

An object of the present invention is to provide an inlet arrangement for an internal combustion engine which can achieve the advantages of both low flow/high swirl ports and high flow/low swirl ports.

SUMMARY OF THE INVENTION

According to the invention there is provided an inlet arrangement for the cylinder of an internal combustion engine comprising two gas inlet ports of given flow/swirl type which terminate at respective orifices openable and closable by a respective valve and means in each port for varying the direction of gas flow through each orifice past the respective valve so that the gas can flow through each orifice as if the ports were of different flow/swirl type.

By providing means for varying the direction of flow, it is possible with, say, an inlet arrangement designed as a high flow/low swirl type, to modify the gas flow direction at relatively low throttle openings to provide high barrel swirl previously obtainable only with an inlet arrangement specifically designed as a low flow/high swirl type. Furthermore, at large throttle openings, the high flow/low swirl characteristic of the inlet arrangement is retained for good maximum power.

Preferably the inlet ports are arranged substantially symmetrically relative to the cylinder axis. This eliminates axial swirl in the cylinder and helps to maximise the effect of the high flow/low swirl characteristic at maximum power.

In one embodiment, said means comprises at least one respective gas inlet duct, preferably of smaller cross section than the inlet port, which introduces a further flow of gas transverse to the flow of gas in the respective inlet port so as to change the direction of gas flow through the respective orifice.

The gas which flows through each inlet duct may be at a higher pressure than that of the gas which flows through the respective inlet port. The gas which flows through each inlet duct may be supplied from an induction system for the engine upstream of a throttle valve.

Alternatively, the gas which flows through each gas inlet duct may be supplied from an exhaust system of the engine.

Two of said inlet ducts may be provided in spaced apart manner. The inlet duct or ducts may direct gas into the inlet port at positions adjacent the orifice.

The gas, normally air, which flows through the inlet port will normally be mixed with fuel to be burnt in the engine.

In another embodiment said means may comprise a movable member, eg a rotary member in a wall of the inlet port which is movable between a first position in which a surface thereof preferably forms a substantially uninterrupted surface part of the inlet port and a second position where said surface projects into the gas as it flows through the inlet orifice to change the direction of gas flow through the orifice. In such a case, the rotary member may be substantially of D-shaped cross section preferably with a cylindrical surface of the D-shape positioned in a cavity such as a substantially complementary shaped depression formed in the wall.

In further embodiments, the means for varying the direction of gas flow may be an element such as a plate mounted for movement between a first position in which the gas can flow through the orifice in, for example, high flow/low swirl manner and a second position in which the direction of gas flow through the orifice is changed so that the gas can flow in, say, a low flow/high swirl manner.

In one such embodiment, the element is mounted on a wall of the respective inlet port adjacent a curved portion thereof and is movable towards the orifice eg, generally tangentially of the wall so as to deflect the gas flow.

In another embodiment, the element is mounted within a slot or other recess in a wall of the respective inlet port so as to be movable between a first position in which it is contained substantially wholly within the recess and a second position in which it projects from the recess to change the direction of gas flow through the orifice.

In a further embodiment, the element may take the form of a tapered member which is arranged to be movable into or out of the gas flow.

In yet another embodiment, the element may be mounted outside the respective inlet port adjacent the orifice for movement eg, between a first position clear of the orifice and a second position in which it extends partially across the orifice to deflect gas flow. The member can be reciprocable between its first and second positions or rotatable therebetween.

In a further embodiment the means may comprise a respective member defining a nozzle through which the gas flows, the nozzle being movable so as to vary the direction of gas flow through the orifice.

In a still further arrangement, the means comprises a respective inflatable element such as a membrane provided on a wall of the respective inlet port whereby, in a deflated position, the element allows substantially normal flow in, say, a high flow/low swirl manner to take place through the port and in an inflated condition deflects the flow of gas to provide flow in a low flow/high swirl manner.

Reference herein to deflection of gas includes deflection of part of the gas flow.

BRIEF DESCRIPTION OF THE DRAWINGS

Inlet arrangements in accordance with the invention will now be described by way of example with reference to the remaining accompanying drawings in which.

DETAILED DESCRIPTION OF THE DRAWINGS

Figure 4:
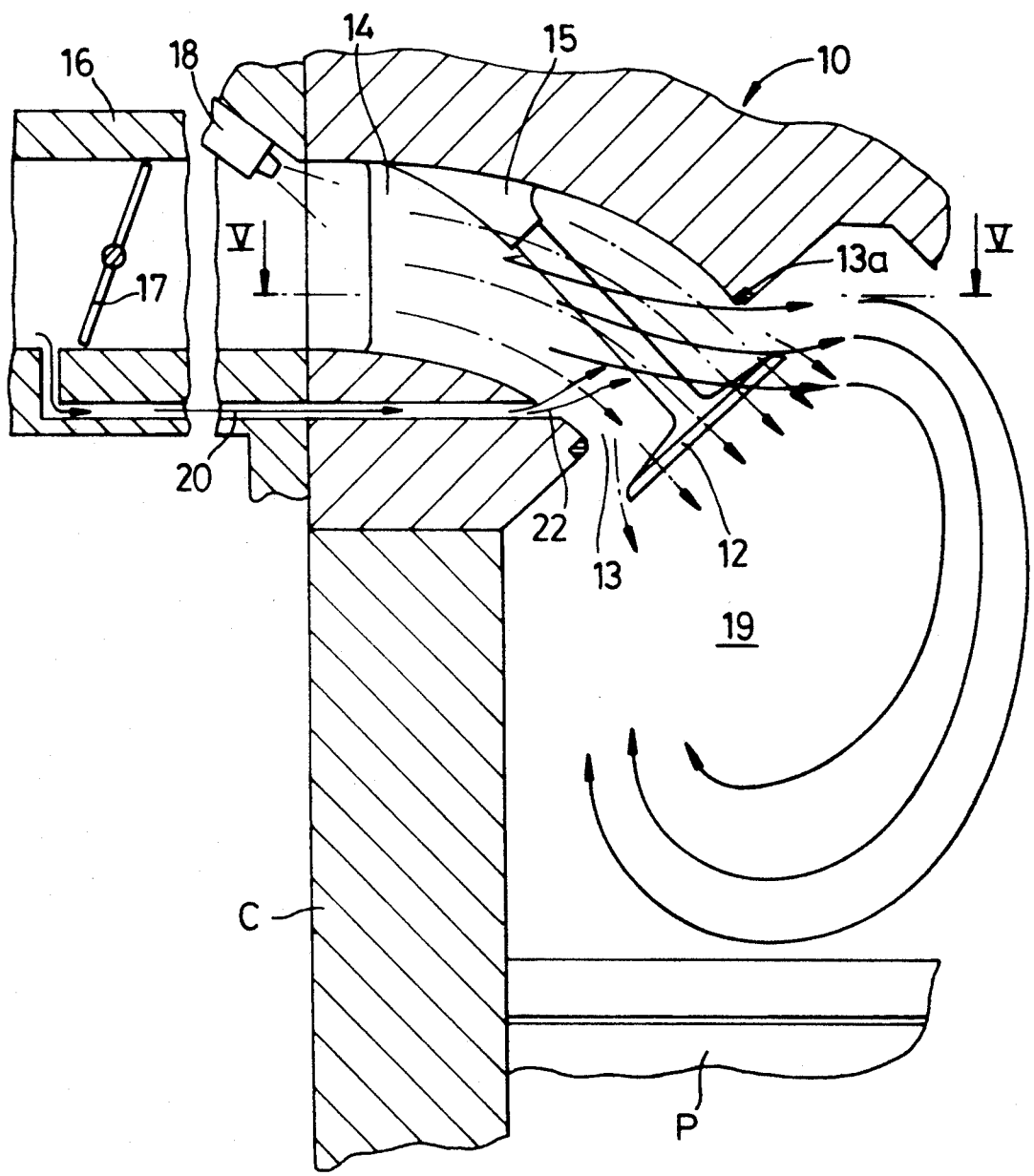
FIG. 4 is a cross section through an inlet port of an internal combustion engine in which a flow of air is used to deflect a flow of mixture passing through the inlet port.
Figure 5:
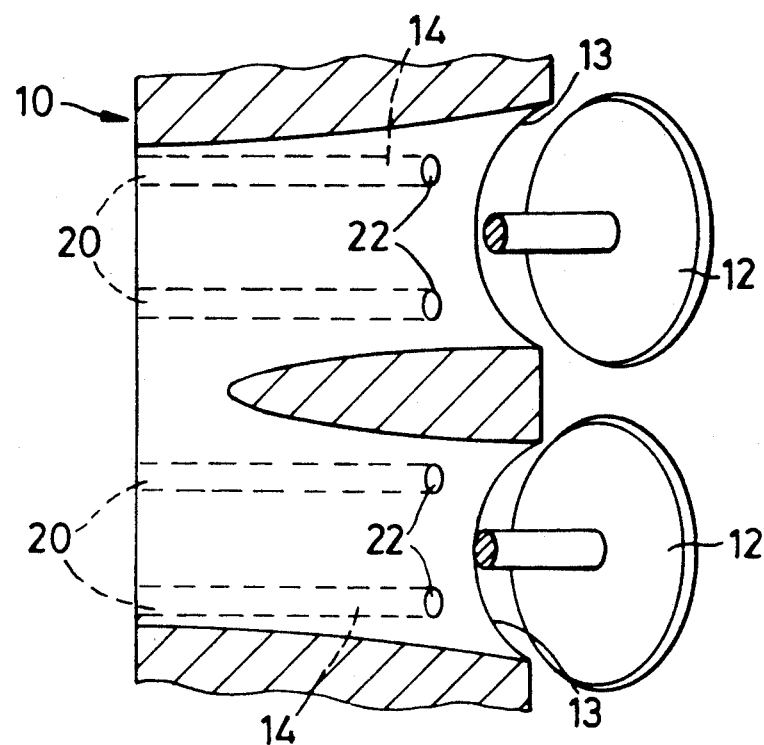
FIG. 5 is a cross section through part of the cylinder head shown in FIG. 4 on the line V—V in FIG. 4.
Figure 5A:
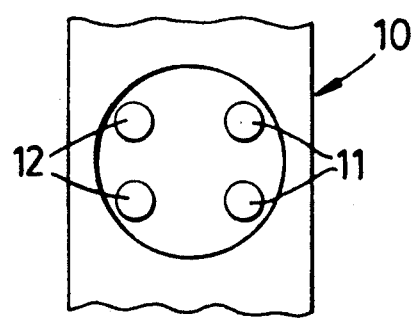
FIG. 5A is a diagrammatic plan view of a cylinder.

Referring to FIGS. 4, 5 and 5A, there is provided a cylinder head 10 of a kind which has two exhaust valves 11 and two inlet valves 12 per cylinder. In FIG. 4, one inlet valve 12 is shown for opening and closing an orifice 13 of an inlet port 14 and, as shown in FIG. 5, two inlet ports 14 are arranged side by side each having its own valve 12. Each valve 12 is slidably mounted in a valve guide 15 and is movable axially by means of a suitable cam shaft (not shown). Each orifice 13 is defined by a valve seat 13a.

Each port 14 is designed to be of a high flow/low swirl type and receives air which flows through a manifold 16 from an air cleaner (not shown) past a throttle valve 17. The manifold 16 supports a fuel injector 18 which injects fuel into the air flow immediately upstream of both ports 14. In that way a mixture of fuel and air flows through each inlet port into a combustion chamber 19 above a piston P. The piston is slidable in a cylinder C.

During large throttle opening, mixture flows through the ports 14 in a direction indicated in broken lines. Although the port 14 is of a low barrel swirl type, it provides good directed flow of mixture into combustion chamber 19 which results in good maximum power.

At small throttle openings, high barrel swirl is desirable and at such small throttle openings, some air from upstream of the throttle valve 17 is fed to each port 14 through two passages 20 having outlets 22 adjacent the orifice 13. As the air passing through passages 20 is taken from the induction system upstream of the throttle valve 17, the air will be at a higher pressure at low throttle openings than that of the mixture and will deflect the mixture through the orifice 13 as shown in full lines so that the mixture flows into the combustion chamber 19 in the manner normally provided by an inlet port of a low flow/high swirl type.

At large throttle openings, the pressure difference between port 14 and the passages 20 will be small and there will be negligible deflection of mixture at such throttle openings.

It is known that exhaust gas can be recirculated and introduced into the incoming fuel and air mixture not only to reduce $NO_x$ emissions but also to improve fuel preparation when starting from cold and on cold driveaway during engine warm-up. In such a case barrel swirl is advantageous. Therefore, instead of using air taken from upstream of the throttle valve 17, exhaust gas supplied from the engine exhaust system could be fed to the passages 20 both to deflect and mix with the mixture.

Instead of simply drawing air through the inlet ducts from the inlet manifold upstream of the throttle valve 17, the air supply could be controlled by a computer controlled engine management system. For example the engine management system could operate a solenoid valve to control flow of air through the inlet duct 20 from upstream of the throttle valve 17 or from some other supply.

In the remaining embodiments, parts corresponding to parts in FIGS. 4 and 5 carry the same reference numerals and will not be described in detail.

Figure 6:
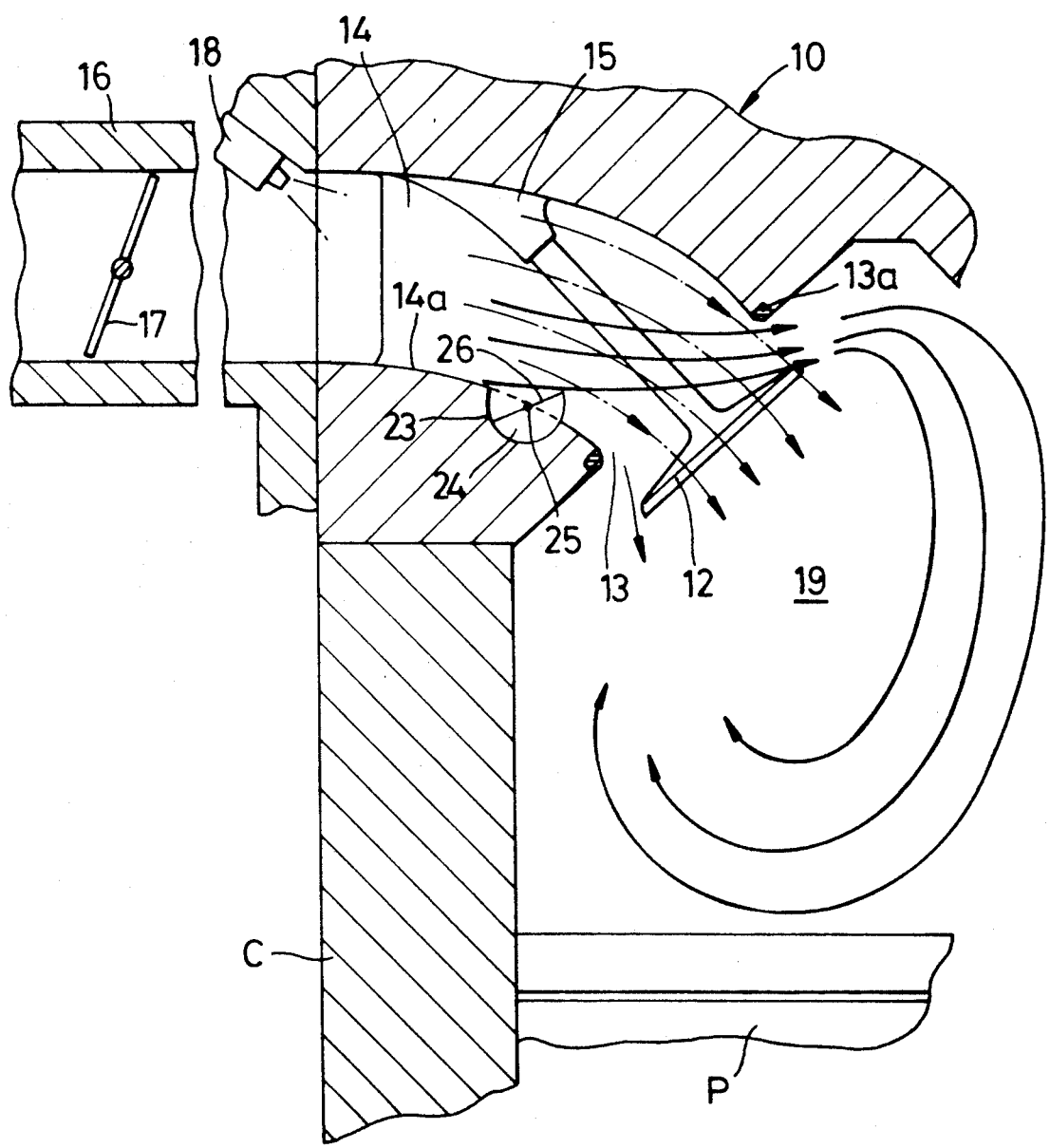
FIGS. 6, 7, 8 and 9 are cross sections through respective inlet ports showing various pivotally mounted flow deflectors.

In FIG. 6, a lower wall 14a of each port 14 is formed with a part cylindrical recess 23 in which a dam 24 of D-shaped cross section is rotatably mounted. The dam 24 is pivotable about an axis 25 between a broken line first position in which a surface 26 of the dam 24 forms substantially an uninterrupted surface part of the wall 14a and a full line second position in which the surface 26 projects into the port 14. The dam 24 occupies the broken line position during large throttle openings so that the port 14 permits high flow/low swirl with the mixture flowing as shown in broken lines. At small throttle openings the dam 24 occupies the full line position and the surface 26 deflects the mixture through the orifice 13 as shown in full lines to induce barrel swirl in the combustion chamber 19. In that way the port 14 effectively performs as a low flow/high swirl type. The dam 24 may extend for the full length of the cylinder head 10 so as to provide a common dam for all of the inlet ports 14. A suitable operating mechanism (not shown) can then be provided at one end of the cylinder head for rotating the dam 24 about its axis 25. The mechanism may comprise e.g., a vacuum operated motor controlled by an engine management system. Alternatively an electric motor may be used to rotate the dam 24 in response to the engine management system.

Figure 7:
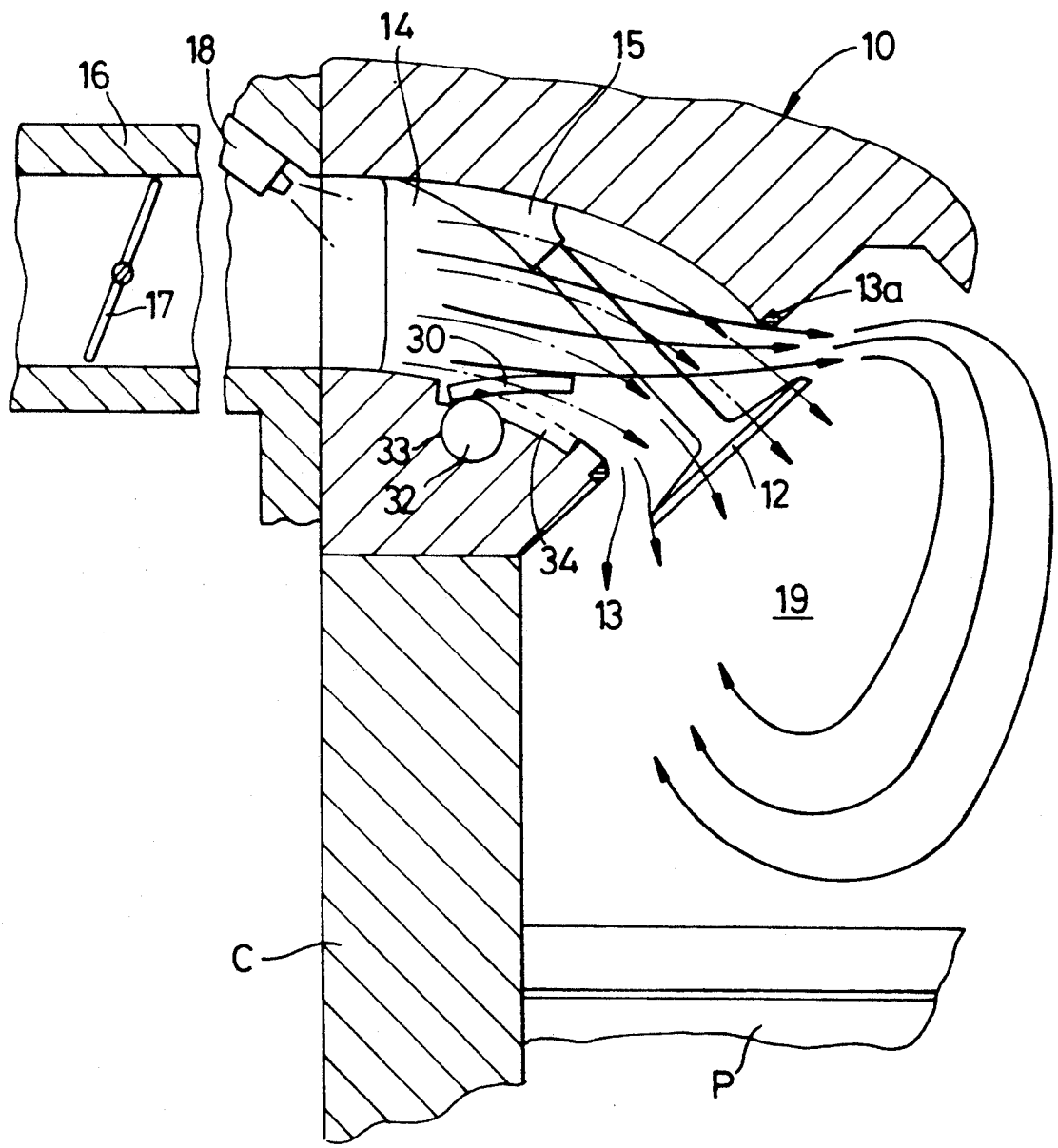

In FIG. 7 the dam is replaced by a series of flaps 30 arranged one in each inlet port 14, each flap 30 being mounted on a circular cross section bar 32 rotatably mounted in part cylindrical recess 33. The bar is rotatable so as to move the flap 30 between a broken line position in which it forms substantially a continuation of the wall 14a and a full line position in which it projects into the port so as to deflect the mixture to induce barrel swirl as shown in full lines. The spindle 32 may be rotated by a mechanism similar to that for rotating dam 24. In the broken line position, the flap is positioned in a complementary shaped recess 34 and the mixture flows in a high flow/low swirl manner as shown in broken lines.

Figure 8:
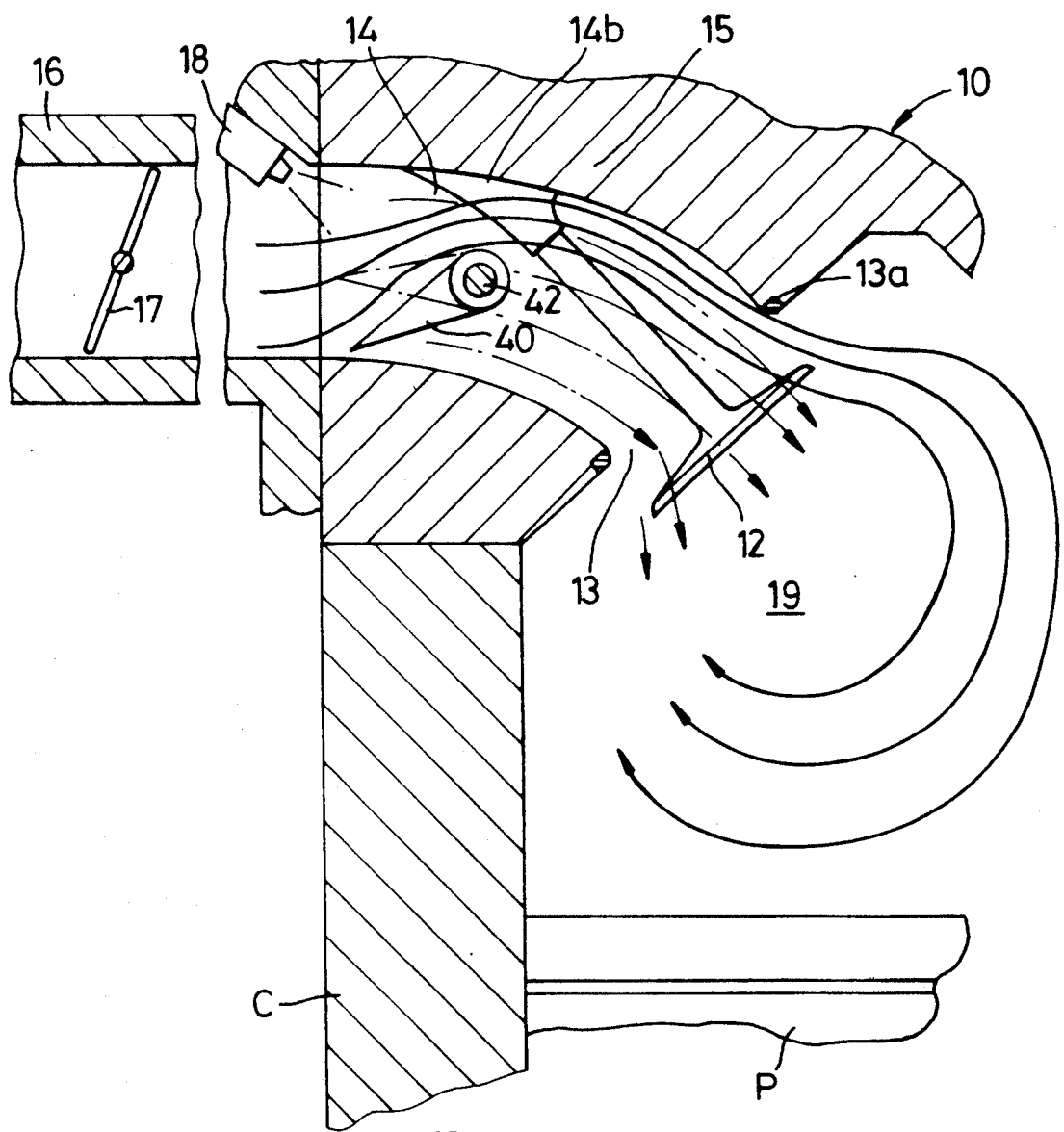
Figure 8A:
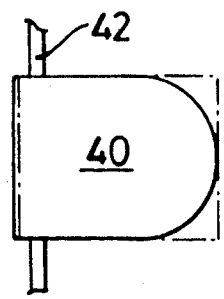
FIG. 8A is a plan view of flow deflector in FIG. 8.

In FIG. 8, a fin 40 generally of D-shaped configuration as shown in FIG. 8A, is mounted in each inlet port 14 on a spindle 42 extending for the full length of the cylinder head 10. The spindle 42 is rotatable to move the fin 40 between a broken line position, permitting the port 14 to perform in high flow/low swirl manner with the mixture flowing as shown in broken lines directly into the combustion chamber 19 for large throttle openings, and a full line position in which the fin 40 effectively blanks off the lower half of its inlet port 14. In the full line position, mixture is forced towards an upper side wall 14b of the port thereby deflecting the mixture through the orifice 13 and causing the mixture to be constrained to flow as shown in full lines enabling barrel swirl to be induced. The D-shaped form of the fin 40 enables the fin to take up the full line position in a circular cross-section inlet port. Alternatively the inlet port 14 could have straight sides at least in the vicinity of the fin 40 so that the fin could be of rectangular form as shown in broken lines in FIG. 8A.

The mechanism for rotating the spindle 42 can be similar to that used to rotate the dam 24.

Figure 9:
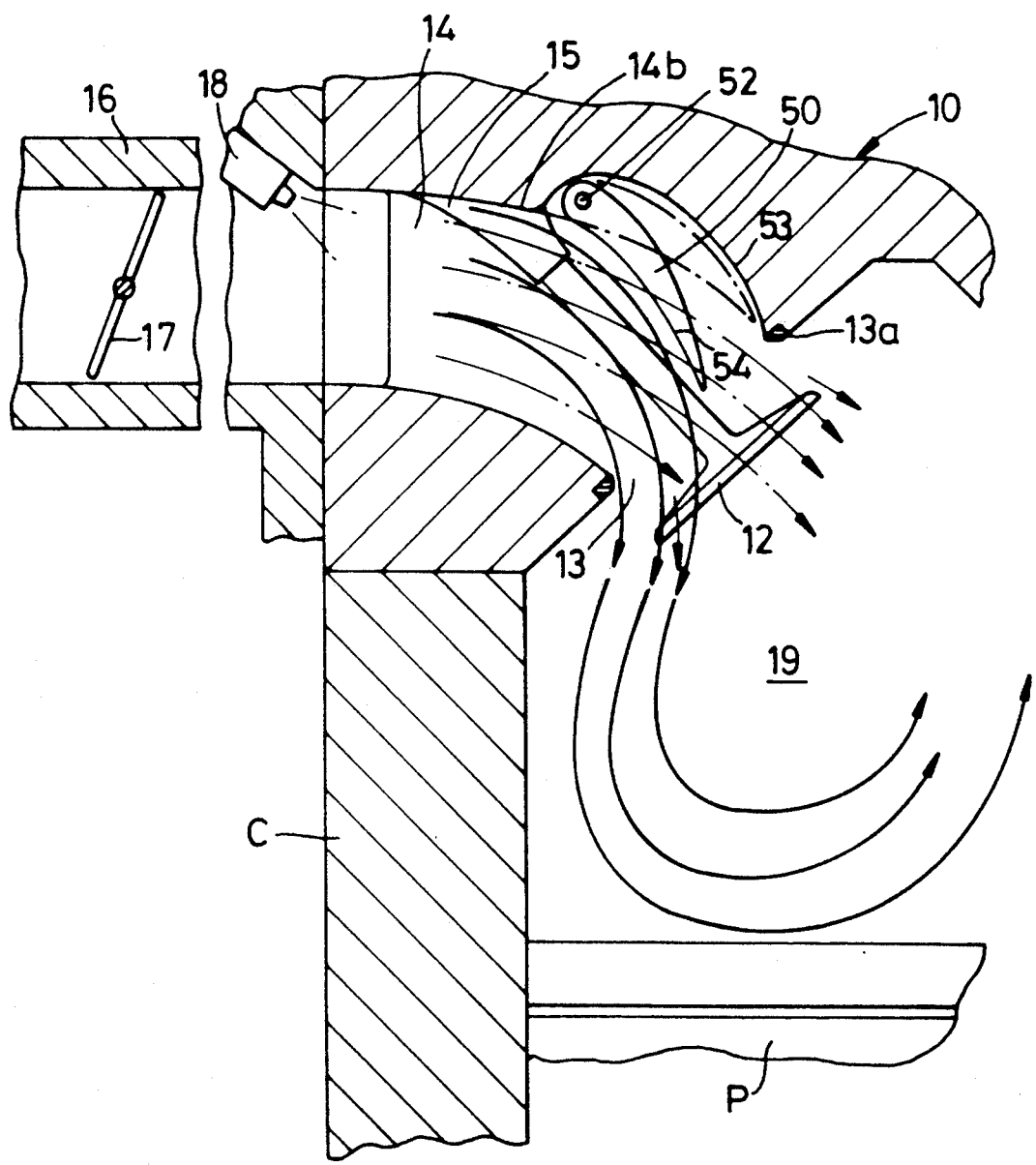

In FIG. 9, each port 14 is provided with a fin 50 mounted on a spindle 52. The spindle 52 extends for the full length of the cylinder head 10. The fin 50, in a broken line position, is positioned within a recess 53 formed in the upper wall 14b of the port and is movable between the full line position in which a lower surface 54 thereof follows substantially the original line of the upper surface 14b, and a full line position. Such movement is effected by rotation of the spindle 52 and the mechanism for rotating the spindle may be similar to that used to rotate the dam 24. In the broken line position of the fin 50, port 14 performs as a high flow/low swirl type and mixture flows through the port as shown in broken lines. In the full line position of the fin 50, the port effectively performs as a low flow/high swirl type and mixture is deflected through the orifice 13 so as to follow the path shown in full lines whereby barrel swirl is induced in the combustion chamber 19. In FIG. 9, the mixture is constrained to flow predominantly across the bottom of valve 12 to induce anti-clockwise barrel swirl whereas in FIGS. 4 to 8 the deflected mixture flows predominantly over the top of the valve to induce clockwise barrel swirl.

Figure 10:
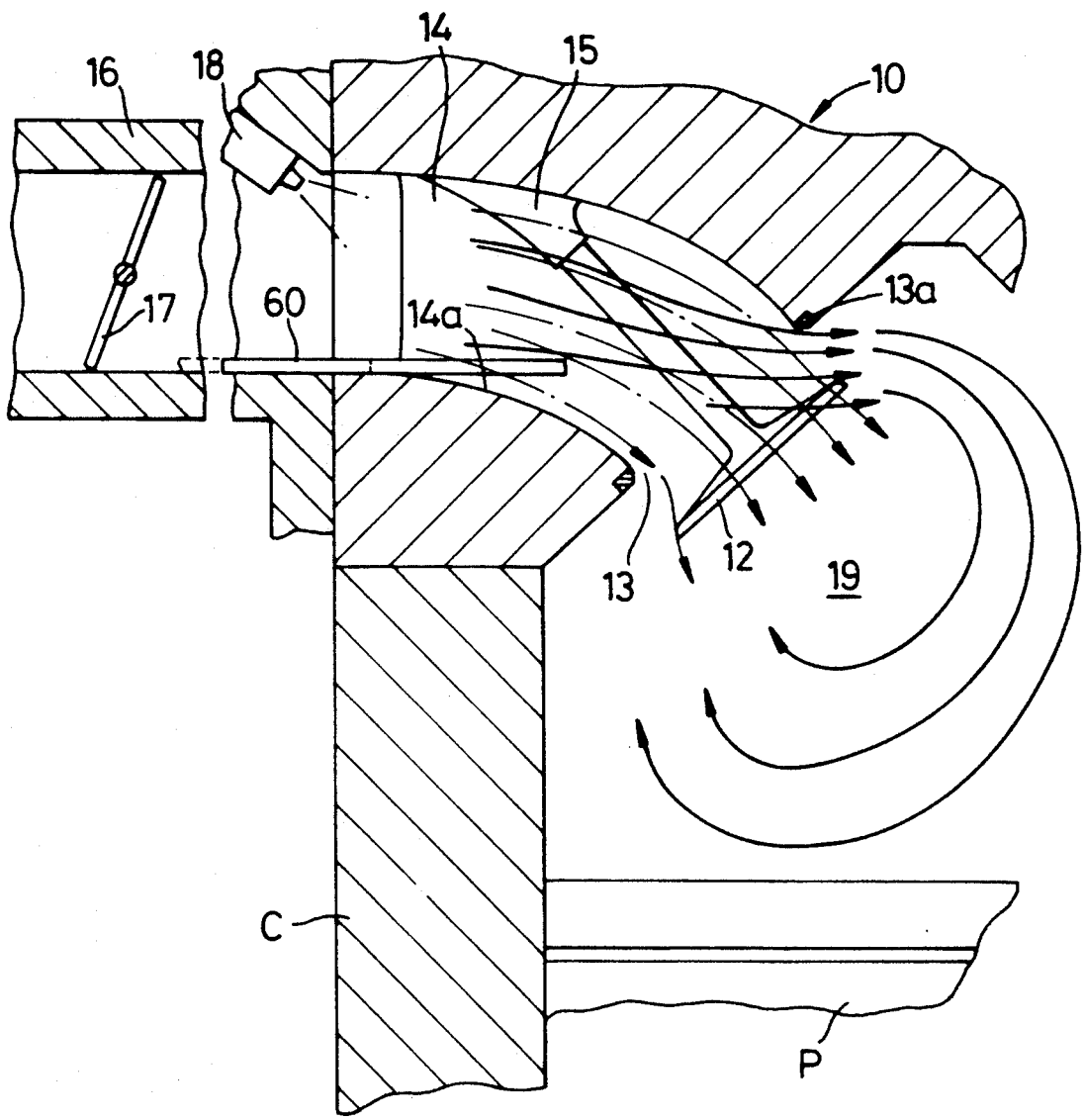
FIGS. 10, 11, 12 and 13 are cross sections through respective inlet ports showing four different configurations of linearly movable elements for deflecting the flow of mixture passing through the inlet ports.

In FIG. 10, a plate 60 is mounted on the lower wall 14a of each port 14 and is movable generally tangentially to the wall from a position shown in broken lines where mixture flows as shown in broken lines directly into the cylinder at large throttle openings to a position shown in full lines in which mixture is deflected through the orifice 13 and flows as shown in full lines predominantly over the top of the valve 12 to induce clockwise barrel swirl in the combustion chamber at low throttle openings. The plate 60 may be flat, curved in a direction transverse to its direction of movement in a complementary shape to the wall 14a or may be of sleeve-like form. A device (not shown) is provided for moving the plate between its full and broken line positions and may be controlled by an engine management system.

Figure 11:
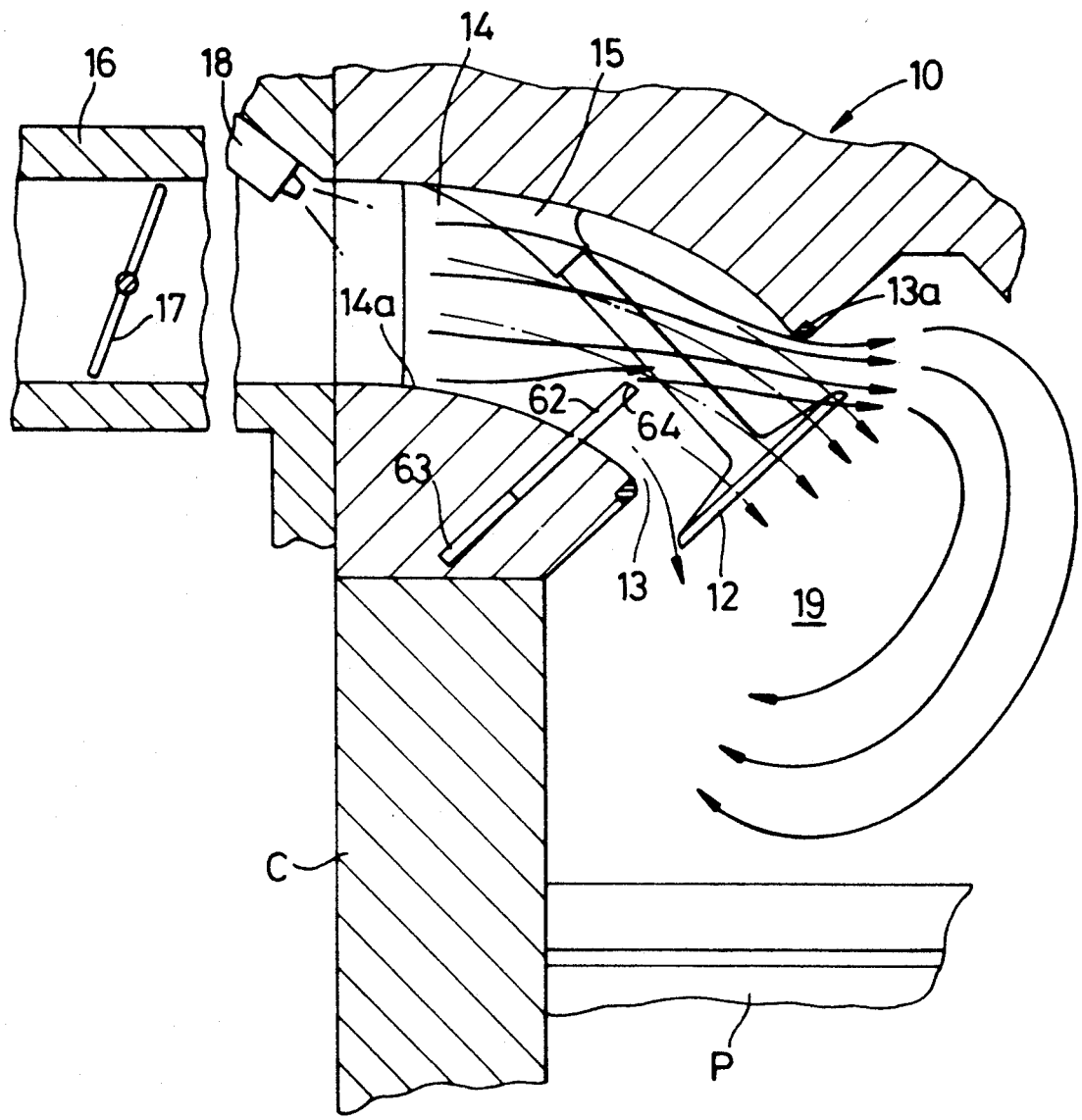

In FIG. 11, a flat plate 62 is slidably mounted in a slot 63 in the cylinder head and is movable between a full line position, in which an upper edge 64 of the plate forms a substantially uninterrupted part of the port wall 14a, and a broken position in which the plate projects into the port 14 to deflect the flow of mixture through the orifice 13 predominantly over the top of the valve 12. The plate 62 is driven, e.g., by a suitable drive device controlled by an engine management system so that the broken line position is taken up during small throttle openings so as to induce barrel swirl in a clockwise direction in the combustion chamber 19. A plate 62 is provided for each inlet port 14.

Figure 12:
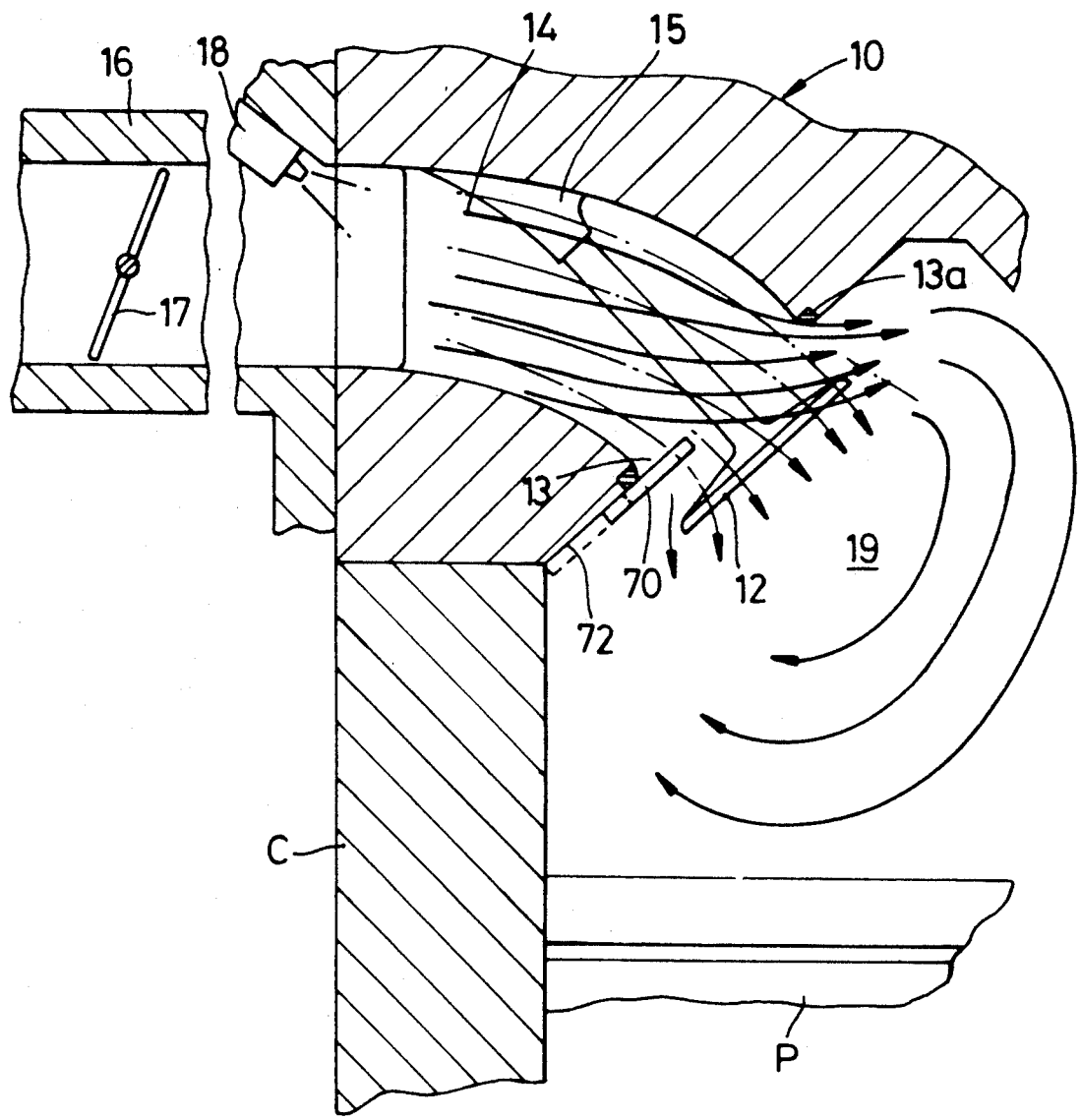

In FIG. 12, a shroud 70 in the form of a flat plate is mounted on a wall 72 of the cylinder head 10 for movement between a broken line position clear of the orifice 13 and a full line position in which the shroud projects across the orifice. The shroud 70 is also reciprocable so as always to occupy the broken line position when the valve 12 is closed. The reciprocating shroud 70 is movable into its full line position during small throttle openings to deflect the mixture through the orifice 13 and over the top of the valve 12 as shown in full lines to create barrel swirl, and is movable into its broken line position during large throttle openings so that the mixture can enter the combustion chamber 19 directly as shown in broken lines. A shroud 70 is provided for each inlet port 14 and a common reciprocating mechanism may be provided for the shrouds. A vacuum operated device under the control of an engine management system may be provided for moving the reciprocating shrouds simultaneously between the full line and broken line positions. Instead of the shroud being reciprocable it could be suitably shaped and mounted for rotation in synchronism with the valve 12. In that way the shroud could be rotated from a position clear of the orifice 13 to a position in which it projects across the orifice.

Figure 13:
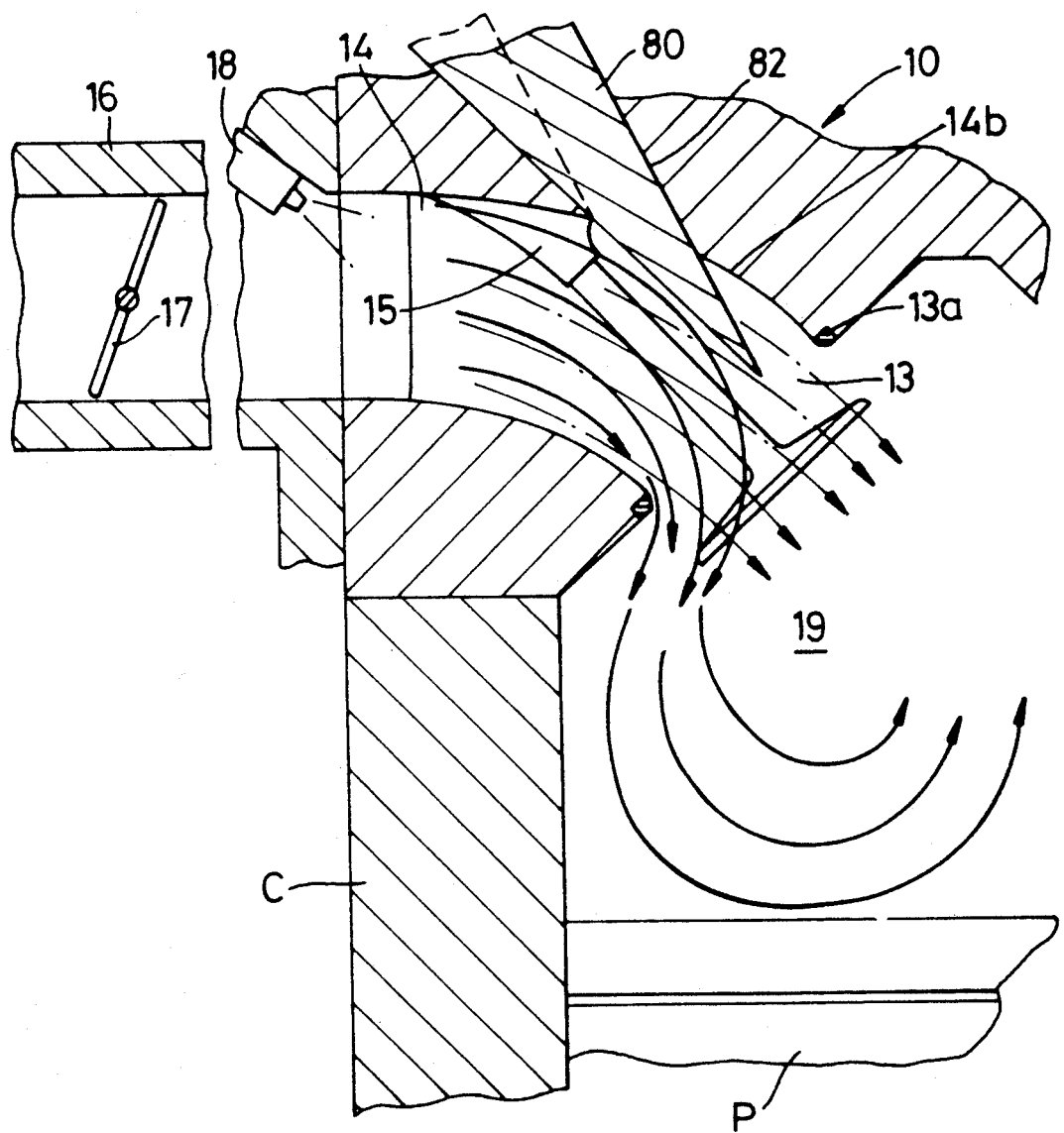

In FIG. 13, a tapered insert 80 is provided in a recess 82 in the port wall 14b. At low throttle openings, the insert 80 occupies the full line position shown so as to deflect the mixture through the orifice over the bottom of the valve so as to induce anticlockwise barrel swirl. At large throttle openings, the tapered insert 80 occupies the position shown in broken lines so as to permit the mixture to flow as shown in broken lines directly into the combustion chamber 19. Suitable sealing may be provided for creating a seal between the recess 82 and the tapered insert 80.

Figure 14:
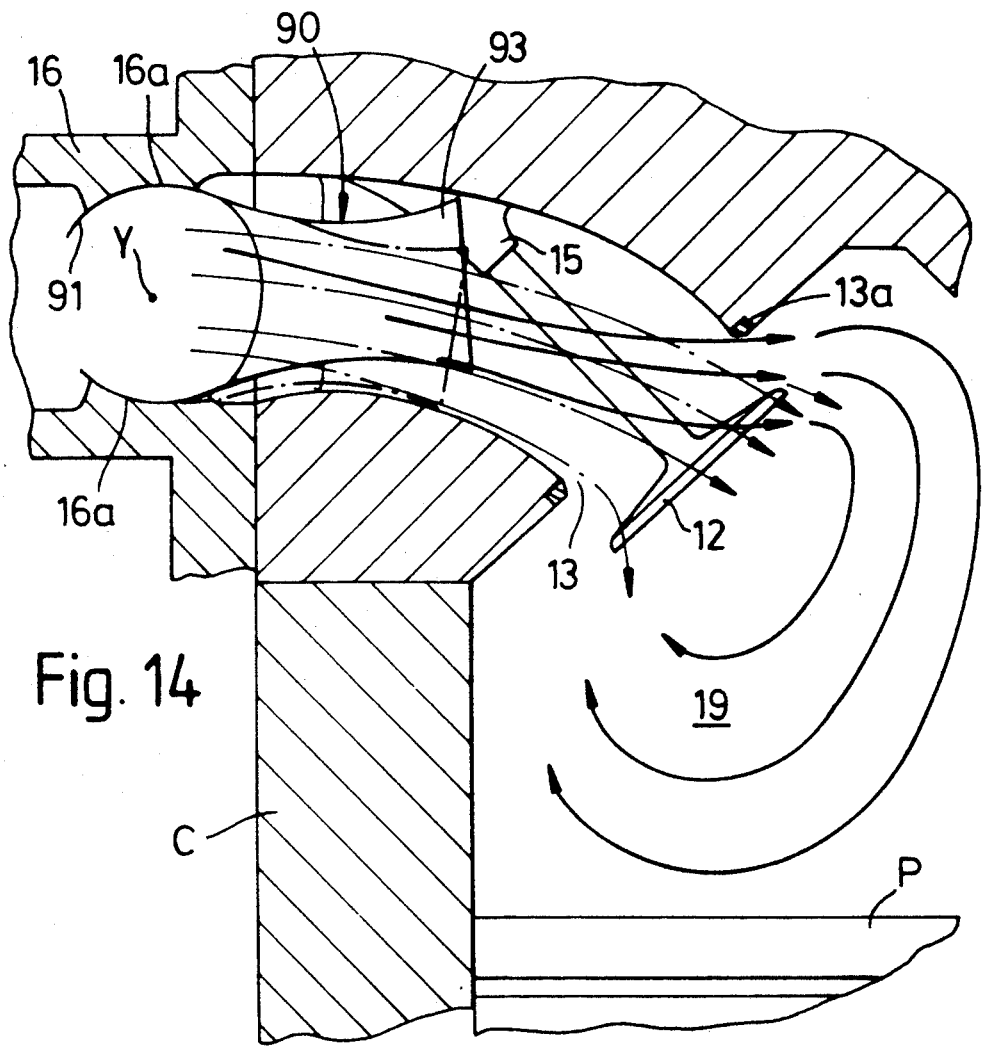
FIG. 14 is a cross section through an inlet port showing a member defining a nozzle projecting into the port for varying the direction of mixture flow through the port.
Figure 15:
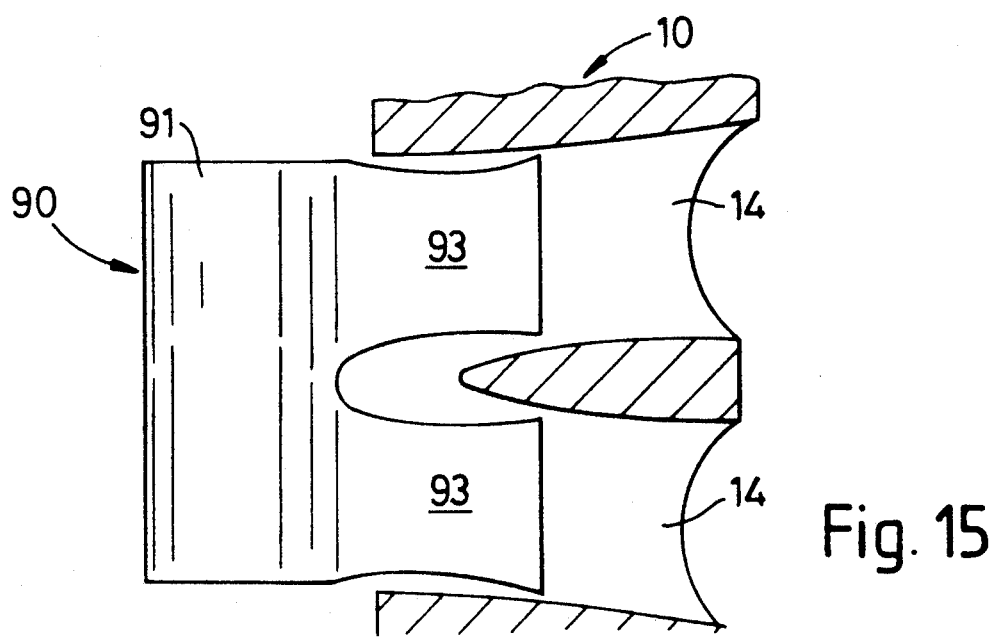
FIG. 15 is a plan view of the nozzle defining member of FIG. 14.

In FIGS. 14 and 15 the inlet manifold 16 rotatably supports a plurality of members 90 on part-cylindrical bearing surfaces 16a, one member 90 being provided for each cylinder of the engine. The member 90 has a part cylindrical open left-hand end 91 as viewed in the drawings that locates in the bearing surfaces 16a for rotation about an axis Y. Each member 90 has two nozzles 93 extending therefrom and projecting into the respective inlet ports 14 as shown in FIG. 15. The member 90 is rotatably between full and broken line positions. In the broken line position, corresponding to large throttle openings, the mixture flows as shown in broken lines directly into the cylinder. In the full line position corresponding to small throttle openings, the mixture is directed predominantly across the top of the valve 12 as shown in full lines to create clockwise barrel swirl in the combustion chamber. The members 90 may be connected to a common rotatable member which can be operated by a device similar to that for operating the dam 24.

Figure 16:
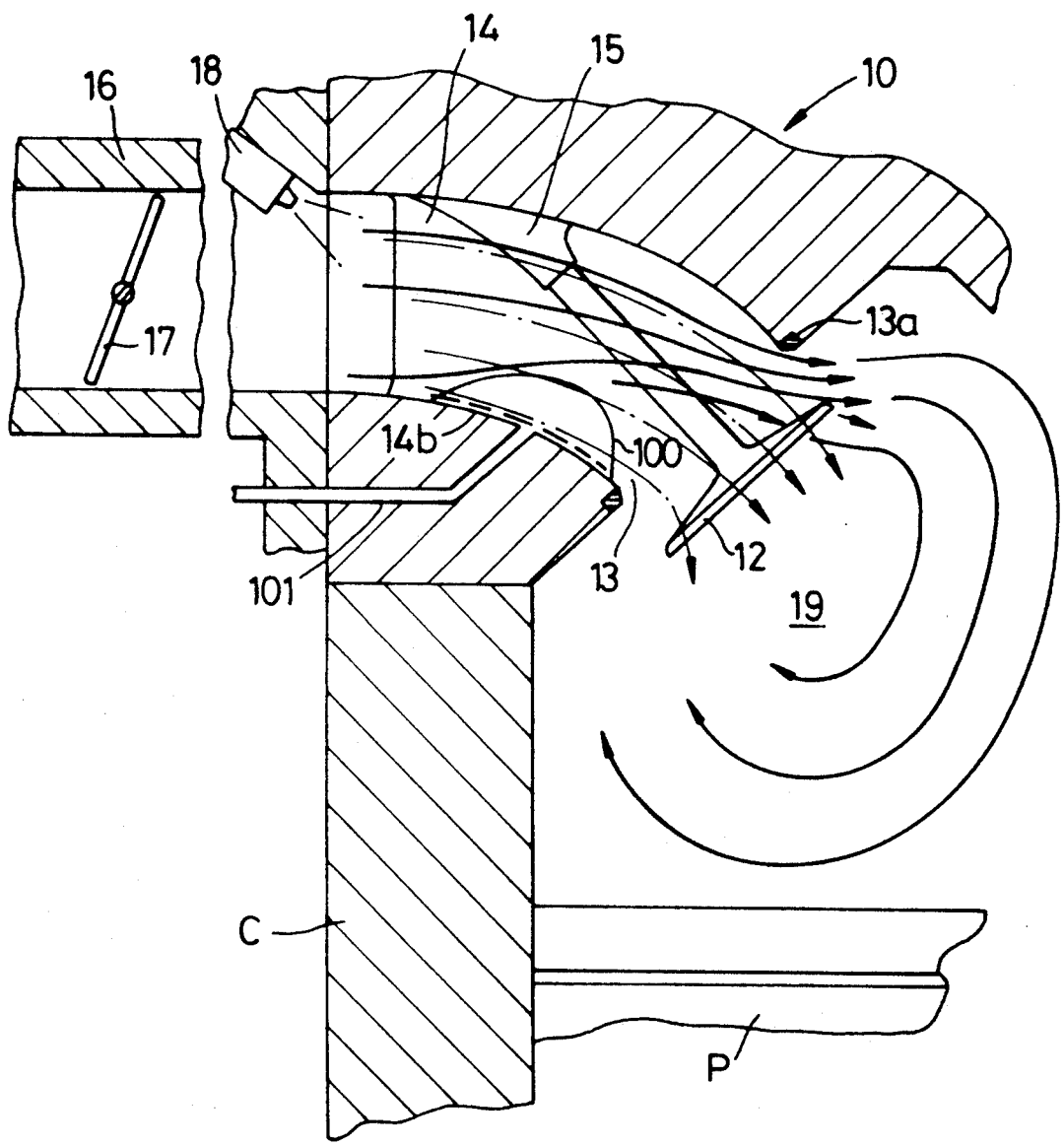
FIG. 16 is a cross section through a port provided with an inflatable membrane for deflecting mixture passing through the port.

In FIG. 16, the wall 14b of port 14 has an inflatable membrane 100 mounted thereon. At large throttle openings, the membrane 100 will be in a deflated condition so as to lie against the wall 14b as shown in broken lines. In that way, mixture will flow as shown in broken lines directly into the combustion chamber 19. At low throttle openings, the membrane 100 will become inflated as shown in full lines so as to deflect the mixture through the orifice 13 as indicated in full lines predominantly across the top of the valve to induce clockwise barrel swirl. Air or other gas for inflating the membrane 100 can be introduced through a passage 101 from a suitable source, e.g., under the control of an engine management system.

In all of the above embodiments, the port 14 is of a high flow/low swirl type to facilitate direct flow of mixture into the cylinder at large throttle openings. However the port 14 can be made to perform as a low flow/high swirl type by changing the flow direction of the mixture as described. The invention is, therefore, particularly useful in that it permits the use of a high flow/low swirl type of inlet port to give good maximum power whilst providing barrel swirl at low throttle openings to achieve the advantages of an inlet port of a high swirl/low flow type.

By deflecting the mixture, as shown in full lines in the various embodiments in accordance with the invention described herein, the internal walls of the cylinder head 10 and the wall of cylinder C defining the combustion chamber 10 constrain the mixture to follow the full-line paths whereby barrel swirl is induced.

Figure 1:
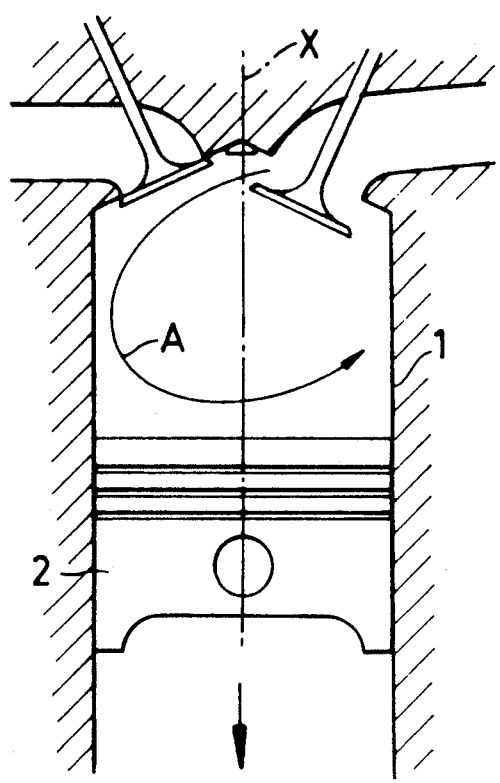
FIGS. 1-3 show barrel swirl.
Figure 2:
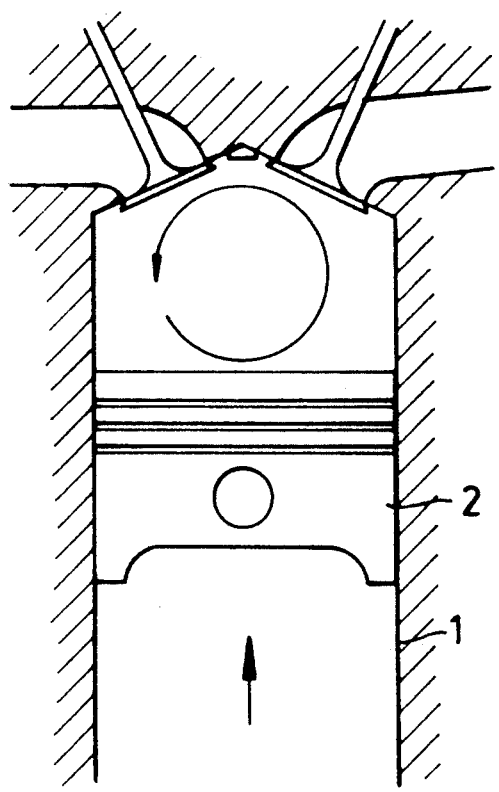
Figure 3:
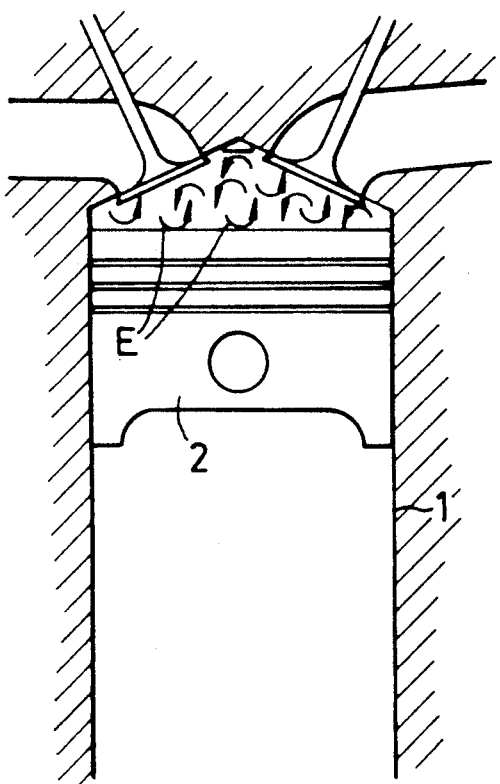

Also in each of the above embodiments of the invention the inlet ports are arranged substantially symmetrically relative to the cylinder axis X (FIG. 1). This contributes to maximising engine output at high engine speeds by substantially eliminating axial swirl.

We claim:

1. An inlet arrangement for the cylinder of an internal combustion engine comprising two gas inlet ports of given flow/swirl type which are arranged substantially symmetrically relative to the cylinder axis and which terminate at respective orifices openable and closable by a respective valve and means in each port for varying the direction of gas flow through each orifice past the respective valve so that the gas can flow through each orifice as if the ports were of different flow/swirl type and substantially without inducing axial swirl in the cylinder, said means comprising a movable member provided in or adjacent each inlet port for movement between a position in which gas can flow through the respective orifice substantially directly and a position in which the member deflects the gas flow through the orifice.

2. An inlet arrangement according to claim 1 wherein the movable member is a rotary member.

3. An inlet arrangement according to claim 2 wherein the rotary member is movable between a position in which a surface thereof forms a substantially uninterrupted surface part of the inlet port and a further position where said surface projects into the gas as it flows through the inlet orifice to change the direction of gas flow through the orifice.

4. An inlet arrangement according to claim 3 wherein the rotary member is substantially of D-shaped cross section.

5. An inlet arrangement according to claim 4 in which a cylindrical surface of the D-shape is positioned in a cavity formed in the wall of the inlet port.

6. An inlet arrangement for the cylinder of an internal combustion engine comprising two gas inlet ports of given flow/swirl type which are arranged substantially symmetrically relative to the cylinder axis and which terminate at respective orifices openable and closable by a respective valve and means in each port for varying the direction of gas flow through each orifice past the respective valve so that the gas can flow through each orifice as if the ports were of different flow/swirl type and substantially without inducing axial swirl in the cylinder, said means comprising a respective element which is mounted for linear movement between a position in which the gas can flow through the respective orifice substantially directly and a position in which the element deflects gas flow through the orifice.

7. An inlet arrangement according to claim 6 wherein each element is mounted on a wall of the respective inlet port adjacent a curved portion thereof and is movable towards and away from the respective orifice substantially tangentially to the curved wall to vary the direction of gas flow through the orifice.

8. An inlet arrangement according to claim 6 wherein each element is mounted within a slot or other recess in a wall of the respective inlet port so as to be movable between a position in which it is contained substantially wholly within the recess and a position in which projects from the recess to vary the direction of gas flow through the respective orifice.

9. An inlet arrangement according to claim 6 wherein each element is in the form of a tapered member arranged to be movable into or out of the gas flow to vary the direction of gas flow through the respective orifice.

10. An inlet arrangement according to claim 6 wherein each element is mounted outside the respective inlet port.

11. An inlet arrangement according to claim 10 wherein each element is movable between a first position clear of the respective orifice and a second position in which it extends partially across the orifice to vary the direction of gas flow through the orifice.

12. An inlet arrangement according to claim 11 wherein the element is movable by means whereby the element is reciprocable or rotatable between the first and second positions to permit closure of the orifice by the valve.

13. An inlet arrangement for the cylinder of an internal combustion engine comprising two gas inlet ports of given flow/swirl type which are arranged substantially symmetrically relative to the cylinder axis and which terminate at respective orifices openable and closable by a respective valve and means in each port for varying the direction of gas flow through each orifice past the respective valve so that the gas can flow through each orifice as if the ports were of different flow/swirl type and substantially without inducing axial swirl in the cylinder, said means comprising a respective movable nozzle through which the gas flows into the inlet port.

14. An inlet arrangement according to claim 13 wherein the nozzle is pivotable between a first position in which gas can flow through the orifice substantially directly and a second position in which the nozzle changes the direction of gas flow through the orifice.

15. An inlet arrangement for the cylinder of an internal combustion engine comprising two gas inlet ports of given flow/swirl type which are arranged substantially symmetrically relative to the cylinder axis and which terminate at respective orifices openable and closable by a respective valve and means in each port for varying the direction of gas flow through each orifice past the respective valve so that the gas can flow through each orifice as if the ports were of different flow/swirl type and substantially without inducing axial swirl in the cylinder, said means comprising a respective inflatable element provided on a wall of the respective inlet port whereby in a deflated position the element allows gas to flow through the respective orifice substantially directly and in an inflated condition deflects the flow of gas to change the direction of gas flow through the orifice.

* * * * *